(12) United States Patent
Hennig et al.

(10) Patent No.: US 10,648,466 B2
(45) Date of Patent: May 12, 2020

(54) PISTON PUMP FOR A HYDRAULIC VEHICLE BRAKE SYSTEM

(71) Applicant: Robert Bosch GmbH, Stuttgart (DE)

(72) Inventors: Oliver Hennig, Obersulm (DE); Patrick Schellnegger, Ludwigsburg (DE); Jens Norberg, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 14/875,752

(22) Filed: Oct. 6, 2015

(65) Prior Publication Data
US 2016/0102657 A1    Apr. 14, 2016

(30) Foreign Application Priority Data
Oct. 8, 2014 (DE) .................. 10 2014 220 368

(51) Int. Cl.
| | | |
|---|---|---|
| F04B 49/22 | (2006.01) | |
| B60T 17/02 | (2006.01) | |
| B60T 8/40 | (2006.01) | |
| F04B 11/00 | (2006.01) | |
| F04B 1/0404 | (2020.01) | |

(Continued)

(52) U.S. Cl.
CPC ......... *F04B 49/225* (2013.01); *B60T 8/4031* (2013.01); *B60T 17/02* (2013.01); *F04B 1/0404* (2013.01); *F04B 7/0088* (2013.01); *F04B 7/0266* (2013.01); *F04B 11/0033* (2013.01); *F04B 11/0091* (2013.01); *F04B 39/1086* (2013.01); *F04B 49/03* (2013.01); *F04B 49/08* (2013.01); *F04B 53/1047* (2013.01); *F04B 53/1075* (2013.01); *F04B 7/0049* (2013.01);

(Continued)

(58) Field of Classification Search
CPC .... B60T 8/4031; F04B 7/0049; F04B 7/0053; F04B 7/0088; F04B 7/0266; F04B 39/1033; F04B 39/1066; F04B 39/1073; F04B 39/1086; F04B 49/03; F04B 49/035; F04B 49/08; F04B 53/1047; F04B 53/1075; F04B 53/103; F04B 49/225
USPC ............ 303/116.4; 137/513.5, 504, 854, 855
See application file for complete search history.

(56) References Cited

U.S. PATENT DOCUMENTS

| | | | |
|---|---|---|---|
| 6,109,296 A * | 8/2000 | Austin | ................ F16K 31/1266 137/488 |
| 6,520,756 B1 | 2/2003 | Alaze | |
| 2014/0147314 A1* | 5/2014 | Gaertner | ............... F04B 1/0404 417/437 |

FOREIGN PATENT DOCUMENTS

| | | | |
|---|---|---|---|
| CN | 102410200 A | 4/2012 | |
| DE | 102010040329 A1 * | 3/2012 | ............ B60T 8/4031 |

(Continued)

OTHER PUBLICATIONS

Machine Translation of DE 102010040329.*

*Primary Examiner* — Alexander B Comley
(74) *Attorney, Agent, or Firm* — Maginot, Moore & Beck LLP

(57) ABSTRACT

A piston pump includes a perforated disk as a throttle, in a central hole of which an outlet valve is arranged and its inner edge is fixed externally on a cylinder sleeve base of the piston pump and an outer edge of which lies with prestress on an annular support. Brake fluid displaced out of the piston pump lifts the perforated disk-shaped throttle off from the annular support, with which a dynamic throttle is formed. A throttle channel which negotiates the annular support in the (Continued)

perforated disk-shaped throttle also enables a throughflow in the case of a throttle lying on the annular support.

11 Claims, 4 Drawing Sheets

(51) Int. Cl.
| | | |
|---|---|---|
| *F04B 39/10* | (2006.01) | |
| *F04B 7/00* | (2006.01) | |
| *F04B 49/03* | (2006.01) | |
| *F04B 7/02* | (2006.01) | |
| *F04B 49/08* | (2006.01) | |
| *F04B 53/10* | (2006.01) | |
| *F04B 53/12* | (2006.01) | |

(52) U.S. Cl.
CPC ......... *F04B 7/0053* (2013.01); *F04B 39/1033* (2013.01); *F04B 53/12* (2013.01)

(56) References Cited

FOREIGN PATENT DOCUMENTS

| | | | | |
|---|---|---|---|---|
| DE | 10 2011 079 876 A1 | | 1/2013 | |
| DE | 102011079876 | * | 1/2013 | |
| DE | 102013200370 A1 | * | 7/2014 | ............ F04B 1/0421 |
| WO | WO-2012084307 A1 | * | 6/2012 | ............ F04B 1/0404 |

* cited by examiner

PISTON PUMP FOR A HYDRAULIC VEHICLE BRAKE SYSTEM

This application claims priority under 35 U.S.C. § 119 to patent application no. DE 10 2014 220 368.6, filed on Oct. 8, 2014 in Germany, the disclosure of which is incorporated herein by reference in its entirety.

BACKGROUND

The disclosure relates to a piston pump for a hydraulic vehicle brake system.

Such piston pumps are used to convey brake fluid in slip-controlled hydraulic vehicle brake systems, they are often also referred to as recirculating pumps. They have a pump piston which is arranged displaceably in a pump bore and can be driven by an eccentric into a to and fro stroke movement in order to convey brake fluid in the vehicle brake system in a manner known per se. The eccentric is typically arranged radially with respect to the pump piston and an eccentric-side face end of the pump piston bears against a circumference of the rotationally drivable eccentric. Several piston pumps can be driven jointly by one eccentric. Two piston pumps—one piston pump for each brake circuit of a dual circuit vehicle brake system—are often arranged opposite one another with the eccentric between them. The piston pumps are also understood as pump elements of such a multi-piston pump. Valves, typically non-return valves, of which one forms an inlet valve and another forms an outlet valve, control a throughflow direction of a pump flow through the piston pump, wherein pump flow refers to a throughflow of the piston pump generated by the stroke movement of the pump piston.

Published patent application DE 10 2011 079 876 A1 discloses such a piston pump for a hydraulic vehicle brake system which has a perforated disk as a dynamic throttle in a pump outlet. An inner edge of the perforated disk is fixed, an outer edge lies with a prestress on an annular support. A pump flow generates a pressure differential at the perforated hole which forms the throttle and which lifts the outer edge of the perforated disk off from the support so that the pump flow flows around the outer edge of the perforated disk. The perforated disk additionally has a small throttle hole between the inner edge and the outer edge through which the pump flow flows as a static throttle irrespective of whether the outer edge of the perforated disk which forms the throttle lies on the support and is lifted off from the support by the pump flow.

SUMMARY

The piston pump according to the disclosure has an elastic perforated disk as a dynamic throttle which is fixed on an inner edge or on an outer edge and the other edge of which, i.e. the outer edge or the inner edge, lies on an annular support. A pump flow generated by the piston pump lifts—if there is sufficient pressure—the outer edge or the inner edge off from the support and flows around or through the perforated disk which thus acts as a dynamic throttle for the pump flow. According to the disclosure, the perforated disk and/or the support has a throttle channel which negotiates the support. The throttle channel is, for example, a notch, groove or the like in the side, which lies on the support, of the perforated disk and/or in the support which negotiates the bearing from the inside to the outside or vice versa so that a pump flow is also possible if the perforated disk lies on the annular support. The throttle channel forms a static throttle.

The throttle according to the disclosure enables an at least approximately linear throttle characteristic curve, i.e. an approximately constant ratio of a brake fluid flow around or through the throttle as a function of a pressure or a pressure differential at the throttle, assuming a static, i.e. constant pump flow.

Further advantages of the disclosure include use in existing piston pumps with low modification outlay and the ability to produce the dynamic throttle at low cost.

The subject matter of the subordinate claims relates to advantageous configurations and further developments of the disclosure.

The disclosure provides that the throttle channel is long in comparison with its hydraulic diameter. In the case of a circular cross-section, the hydraulic diameter is the diameter. The hydraulic diameter is generally a measure of a cross-section which has the same pressure loss as a circular cross-section with otherwise identical flow conditions. For rectangular cross-sections, the hydraulic diameter can be approximately assumed to be four times the quotient of the cross-sectional surface area and of the circumference, i.e. double the quotient of the product and sum of a width and a height of the throttle channel. The throttle channel is preferably at least five times as long as its hydraulic diameter. This configuration achieves an at least approximately linear throttle characteristic curve, i.e. a throughflow quantity through the throttle channel is proportional to a pressure differential.

BRIEF DESCRIPTION OF THE DRAWINGS

The disclosure is explained in greater detail below on the basis of an embodiment represented in the drawing. In the drawing.

DETAILED DESCRIPTION

Figure 1:
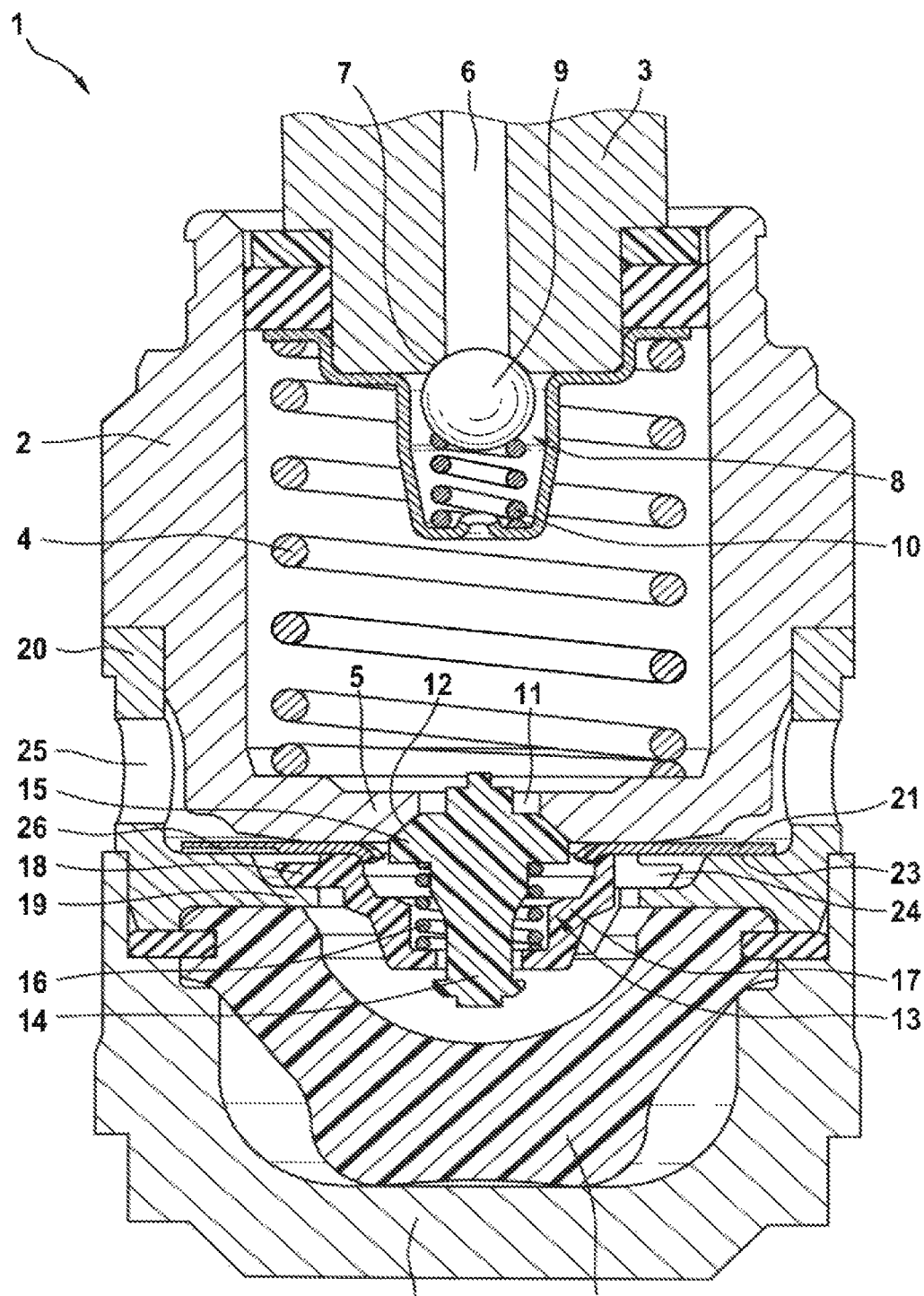
FIG. 1: shows an axial portion of a piston pump according to the disclosure in the region of an outlet valve.

FIG. 1 shows an eccentric-remote end of a piston pump 1 according to the disclosure which is provided as a hydraulic pump for a slip-controlled, hydraulic vehicle brake system. Piston pump 1 has a cylinder sleeve 2 in which a pump piston 3 is received axially displaceably. Pump piston 3 can be driven with an eccentric, not represented, which can be driven rotationally by electromotor, to a stroke movement in cylinder sleeve 2. A piston spring 4, in the exemplary embodiment a helical compression spring, which is arranged in cylinder sleeve 2 and supported on a cylinder sleeve base 5, acts on an end, projecting out of cylinder sleeve 2, of pump piston 3 against a circumference of the eccentric, not represented, which is located on a side of pump piston 3 facing away from piston spring 4.

Pump piston 3 has an axial blind hole 6, which discharges at an end, located in cylinder sleeve 2, of pump piston 3 with a valve seat 7, for a pump inlet. An inlet valve 8 of piston pump 1 is arranged at the end of pump piston 3 located in cylinder sleeve 2. In the described and represented embodiment of the disclosure, inlet valve 8 is a spring-loaded non-return valve with a ball as a blocking body 9 which is acted upon by a valve spring 10—in the embodiment it is a helical compression spring—against valve seat 7 at the end of pump piston 3 located in cylinder sleeve 2.

Cylinder sleeve base 5 has a central hole 11, the discharge opening of which is embodied conically as a valve seat 12 on an outer side of cylinder sleeve base 5. An outlet valve 13 of piston pump 1 is arranged on the outer side of cylinder sleeve base 5, which outlet valve 13 is embodied as a spring-actuated non-return valve. Non-return valves are not absolutely necessary for inlet valve 8 and outlet valve 13 of piston pump 1. Outlet valve 13 has a bolt-shaped blocking body 14 with a radial flange 15 which has a spherical, annularly circumferential sealing surface which interacts with valve seat 11. A helical compression spring as valve spring 16 acts upon blocking body 14 of outlet valve 13 against valve seat 12 on the outer side of cylinder sleeve base 5. Valve spring 16 is arranged in a bowl-shaped valve housing 17 in which it is supported. Valve housing 17 is arranged enclosing blocking body 14 on the outer side of cylinder sleeve base 5.

Figure 5:
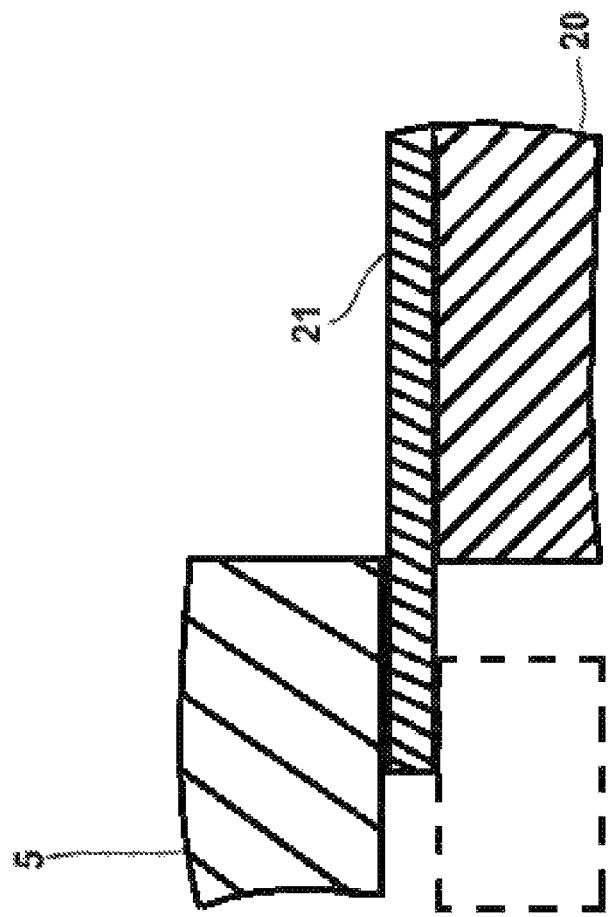
FIG. 5: shows an embodiment of a piston pump including a perforated disk according to the disclosure.

Valve housing 17 has a radial flange 18 which lies on a radial inner flange 19 of a tubular valve holder 20 which is placed on cylinder sleeve 2. An elastic perforated disk as a dynamic throttle 21 is arranged between radial flange 18 and cylinder sleeve base 5. An inner edge of perforated disk-shaped throttle 21 is fixed between radial flange 18 of valve housing 17 and cylinder sleeve base 5. The inner edge of perforated disk-shaped throttle 21 has a rectangular toothing, the teeth 22 of which project inwards and are slightly bent (FIGS. 2, 3) so that they engage in a spherical inner edge of valve housing 17, as a result of which perforated disk 21 is centered. Valve housing 17, which fixes throttle 21 on the outer side of cylinder sleeve base 5, simultaneously forms a throttle holder. In one embodiment, the perforated disk-shaped throttle 21 may also be fixed on the outer edge with the inner edge lying on the support 23, as illustrated in the schematic drawing of FIG. 5.

An outer edge, to be precise, an annular region on the outer edge of perforated disk-shaped throttle 21, lies with prestress on an annular step, facing towards cylinder sleeve base 5, of inner flange 19 of valve holder 20. The annular step forms a support 23 for the outer edge or the outer edge region of perforated disk-shaped throttle 21. Outside of a region in which radial flange 18 of valve housing 17 fixes the inner edge of throttle 21 externally on cylinder sleeve base 5, the outer side of cylinder sleeve base 5 is slightly conical so that throttle 21 can deform elastically and as a result can lift off from support 23.

Throttle 21 deforms elastically if pump piston 3 displaces brake fluid out of cylinder sleeve 2 through outlet valve 13. The brake fluid displaced by pump piston 3 flows through radial flange 18 of valve housing 17, which is provided, for this purpose, with apertures 24, on a side of perforated disk-shaped throttle 21 facing away from cylinder sleeve base 5 and lifts its outer edge off from support 23 if the pressure is sufficiently high. The brake fluid displaced by pump piston 3 flows through a gap between the outer edge or the outer edge region of throttle 21 and support 23 which is formed if the brake fluid lifts the outer edge of throttle 21 off from support 23 and flows around perforated disk-shaped throttle 21 at its outer edge. From there, the brake fluid flows through outlet openings 25 in valve holder 20 out of piston pump 1. Perforated disk-shaped throttle 21 forms a dynamic throttle 21 which releases a throttle cross-section between support 23 and the outer edge of throttle 21 if a brake fluid pressure is sufficient to lift the outer edge of throttle 21 lying on support 23 off from support 23. A size of the opening throttle cross-section between the outer edge of throttle 21 and support 23 is dependent on pressure and quantity of brake fluid. The construction according to the disclosure results in an approximately linear throttle characteristic curve, i.e. an almost constant dependency between a brake fluid volumetric flow through and around throttle 21 and a pressure differential at throttle 21.

Figure 2:
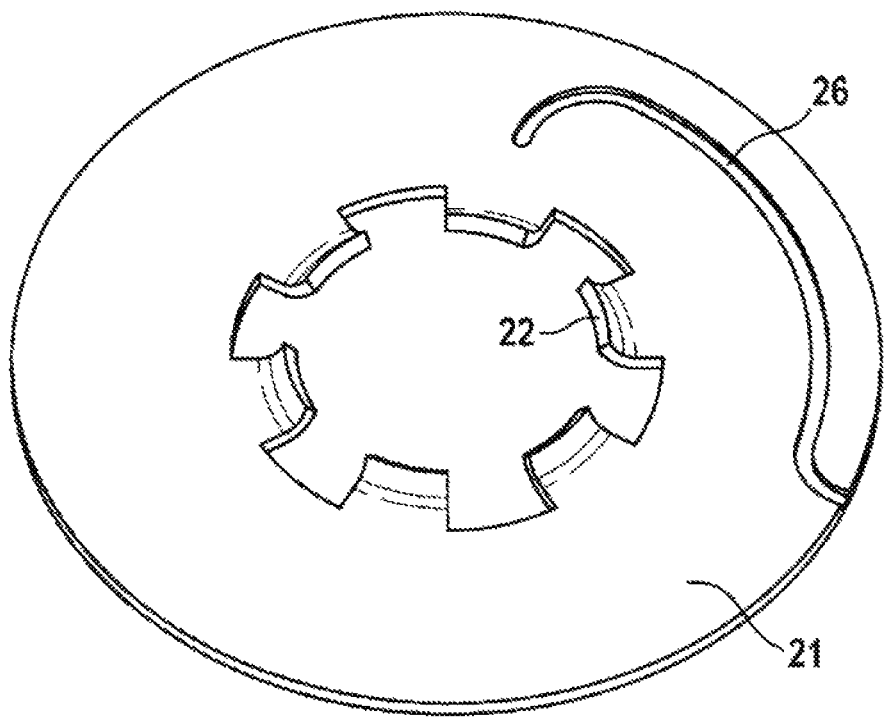
FIG. 2: shows a variant of a perforated disk as a dynamic throttle according to the disclosure of the piston pump from FIG. 1 in a perspective view.
Figure 3:
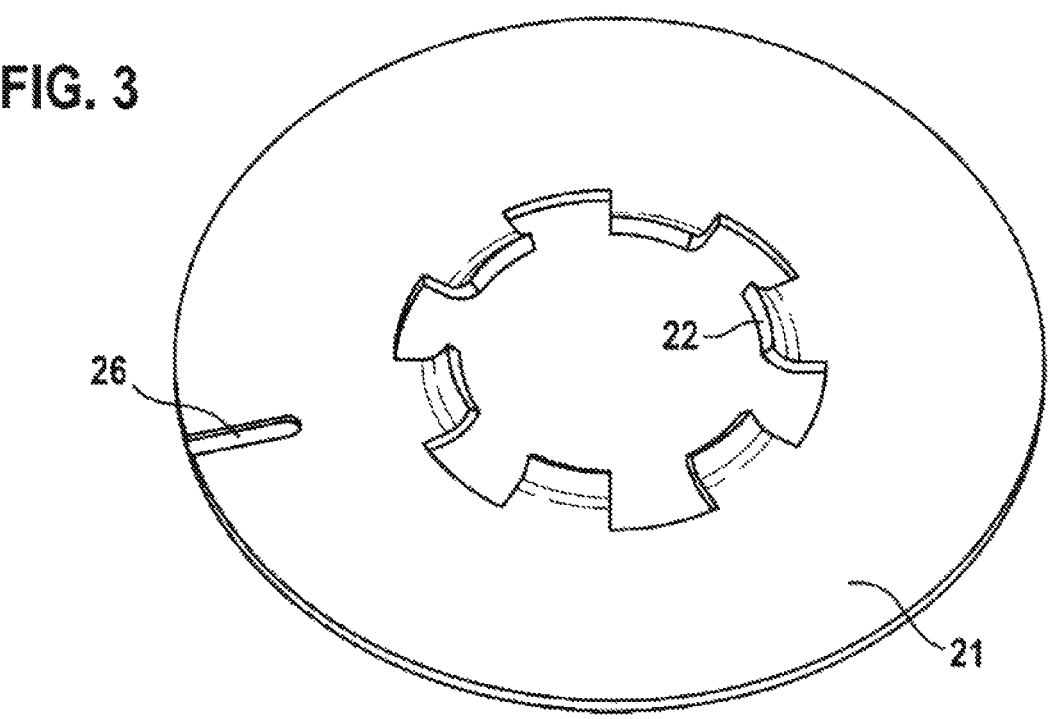
FIG. 3: shows a variant of a perforated disk as a dynamic throttle according to the disclosure of the piston pump from FIG. 1 in a perspective view.

In a side facing towards bearing 23, perforated disk-shaped throttle 21 has a notch as a throttle channel 26. Throttle channel 26 can run, for example, in a bent manner, also bent several times, as can be seen in FIG. 2, or straight, as can be seen in FIG. 3. Throttle channel 26 can run radially as in FIG. 3 or at a different angle. In FIG. 2, throttle channel 26 runs across a portion of approximately a quarter arc within support 23 in the circumferential direction before it bends away inwardly at one end and outwardly at the other end. In each case, throttle channel 26 penetrates through support 23, i.e. throttle channel 26 begins within support 23 and discharges at the outer edge of throttle 21. Brake fluid also flows through throttle channel 26 when its outer edge lies on support 23. Throttle 21 as a result forms both a static as well as a dynamic throttle 21 for brake fluid displaced by pump piston 3 out of cylinder sleeve 2, throttle 21 throttles a brake fluid flow into a pump outlet of piston pump 1 and as a result damps pressure changes such as pressure fluctuations and pressure surges in the pump outlet. The throttle action is, as explained, static and dynamic with an approximately linear throttle characteristic curve.

Throttle channel 26 is long in comparison to its cross-section or its width and height. A length of radially running throttle channel 26, as can be seen in FIG. 3, is already a multiple of its width and height. If throttle channel 26 is instead arranged obliquely (not drawn), it is elongated. Throttle channel 26, which can be seen in FIG. 2 and itself can be elongated up to almost an entire revolution, is even longer. If throttle channel 26 is at least five times as long as its hydraulic diameter, an at least approximately linear throttle characteristic curve, i.e. a throughflow quantity proportional to a pressure differential at throttle 21, is achieved. For a rectangular throttle channel 26, the hydraulic diameter can be assumed approximately as four times the product of its cross-sectional surface area and its circumference, i.e. as double the quotient of the product and the sum of height and width of throttle channel 26. Throttle channel 26 running in a bent manner from FIG. 2 surpasses this by far.

A cap-shaped valve cover 27 is arranged in a cup-shaped pump cover 28, which is placed on holder 20 and holds and seals off in a pressure-resistant manner piston pump 1 in a cylindrical hole-shaped, diameter-stepped receiver of a hydraulic block, not represented, of a slip control of a hydraulic vehicle brake system, on a side, opposite cylinder sleeve base 5, of inner flange 19 of valve holder 20.

Figure 4:
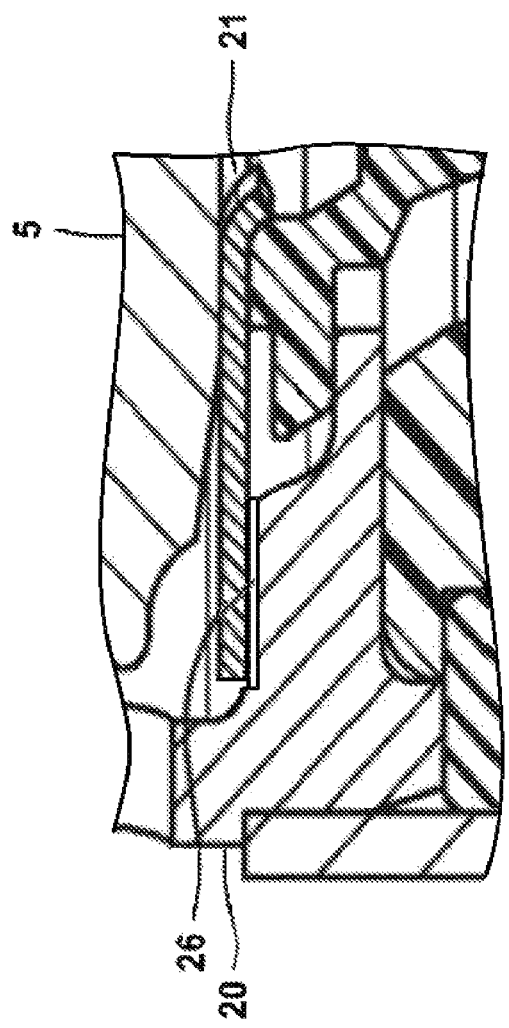
FIG. 4: shows an embodiment of a piston pump including a perforated disk according to the disclosure.

Throttle channel 26 can be provided in support 23 instead of in the perforated disk which forms throttle 21 as shown in FIG. 4. It is also possible to provide a throttle channel 26 both in perforated disk-shaped throttle 21 and in support 23 (not represented).

What is claimed is:

1. A piston pump for a hydraulic vehicle brake system, comprising:
an elastic perforated disk configured as a dynamic throttle, the perforated disk fixed on an inner edge of the perforated disk; and
a supporting structure having an annular support region against which an outer edge of the perforated disk bears,
wherein:
the perforated disk is configured such that a pump flow lifts the outer edge from the annular support region;
at least one of the perforated disk and the annular support region defines a throttle channel extending at least partially in a radial direction from an innermost radial edge of the annular support region to an outermost radial edge of the annular support region;
at least a portion of the throttle channel is defined by a groove in the at least one of the perforated disk and the annular support region, the groove having a depth that is less than a thickness of the perforated disk;
the throttle channel defines a central axis that runs axially along a length of the throttle channel; and
the central axis extends partially in a radial direction of the perforated disk and partially in a circumferential direction of the perforated disk.

2. The piston pump according to claim 1, further comprising:
a cylinder sleeve including a perforated disk-shaped cylinder sleeve base; and
an annular throttle holder arranged on an opposite side of the perforated disk from the cylinder sleeve base, and which fixes the inner edge of the perforated disk on the cylinder sleeve base,
wherein the perforated disk defines a perforated disk hole,
wherein the cylinder sleeve base defines a cylinder sleeve hole aligned with the perforated disk hole, and
wherein the pump flow flows through the perforated disk hole.

3. The piston pump according to claim 2, wherein the cylinder sleeve hole in the cylinder sleeve base has a valve seat of a pump valve.

4. The piston pump according to claim 2, wherein the perforated disk includes a curved inner region that projects inwardly and is bent so as to engage in a spherical inner edge of the annular throttle holder.

5. The piston pump according to claim 1, wherein the perforated disk lies with a prestress on the annular support region.

6. The piston pump according to claim 1, wherein the throttle channel has a length from the innermost edge of the annular support region to the outermost edge of the annular support region that is greater than a hydraulic diameter of the throttle channel.

7. The piston pump according to claim 1, wherein the throttle channel is defined between the supporting structure and the perforated disk from the innermost radial edge to the outermost radial edge of the annular support region when the outer edge of the perforated disk bears against the annular support region.

8. The piston pump according to claim 1, wherein the throttle channel extends to at least the outer edge of the perforated disk.

9. A piston pump for a hydraulic vehicle brake system, comprising:
an elastic perforated disk configured as a dynamic throttle, the perforated disk fixed on an inner edge of the perforated disk; and
a supporting structure having an annular support region against which an outer edge of the perforated disk bears,
wherein:
the perforated disk is configured such that a pump flow lifts the outer edge from the annular support region;
at least one of the perforated disk and the annular support region defines a throttle channel extending at least partially in a radial direction from an innermost radial edge of the annular support region to an outermost radial edge of the annular support region;
at least a portion of the throttle channel is defined by a groove in the at least one of the perforated disk and the annular support region, the groove having a depth that is less than a thickness of the perforated disk;
the throttle channel has a length from the innermost edge of the annular support region to the outermost edge of the annular support region that is greater than a hydraulic diameter of the throttle channel; and
the length of the throttle channel is at least five times as long as the hydraulic diameter of the throttle channel.

10. The piston pump according to claim 9, wherein the throttle channel extends straight in the radial direction.

11. A piston pump for a hydraulic vehicle brake system, comprising:
an elastic perforated disk configured as a dynamic throttle, the perforated disk fixed on an inner edge of the perforated disk;
a supporting structure having an annular support region against which an outer edge of the perforated disk bears;
a cylinder sleeve including a perforated disk-shaped cylinder sleeve base; and
an annular throttle holder arranged on an opposite side of the perforated disk from the cylinder sleeve base, and which fixes the inner edge of the perforated disk on the cylinder sleeve base,
wherein the perforated disk is configured such that a pump flow lifts the outer edge from the annular support region,
wherein the perforated disk defines a throttle channel extending at least partially in a radial direction from an innermost radial edge of the annular support region to an outermost radial edge of the annular support region,
wherein at least a portion of the throttle channel is defined by a groove in the perforated disk, the groove having a depth that is less than a thickness of the perforated disk,
wherein the perforated disk defines a perforated disk hole,
wherein the cylinder sleeve base defines a cylinder sleeve hole aligned with the perforated disk hole,
wherein the pump flow flows through the perforated disk hole, and
wherein the perforated disk includes a curved inner region that projects inwardly and is bent so as to engage in a spherical inner edge of the annular throttle holder.

* * * * *